(12) United States Patent
Mallikarachchi

(10) Patent No.: US 12,023,824 B1
(45) Date of Patent: Jul. 2, 2024

(54) TRIPLE SAW

(71) Applicant: Jayantha Sarath Mallikarachchi, Tampa, FL (US)

(72) Inventor: Jayantha Sarath Mallikarachchi, Tampa, FL (US)

(*) Notice: Subject to any disclaimer, the term of this patent is extended or adjusted under 35 U.S.C. 154(b) by 0 days.

(21) Appl. No.: 18/202,628

(22) Filed: May 26, 2023

(51) Int. Cl.
| | | |
|---|---|---|
| *B23D 59/00* | (2006.01) | |
| *B23D 45/04* | (2006.01) | |
| *B26D 7/22* | (2006.01) | |
| *B27B 5/16* | (2006.01) | |
| *B27B 5/30* | (2006.01) | |

(52) U.S. Cl.
CPC ............... *B27B 5/165* (2013.01); *B27B 5/30* (2013.01)

(58) Field of Classification Search
CPC .......................... B23D 59/001; B23D 45/067; B23Q 11/0092; B23Q 11/06; B27B 5/38; H02H 1/00; B27G 19/16; B27G 19/02; B27G 19/08; F16P 3/12; F16P 3/148; Y10S 83/01
USPC ...... 83/471, 477.1, 490, 62, 58, 62.1, 471.3, 83/397, 630, 477.2, 478, 471.2, 469, 76.7, 83/397.1, 788; 144/382, 383; 340/518, 340/573.1, 680; 307/326; 408/710
See application file for complete search history.

(56) References Cited

U.S. PATENT DOCUMENTS

| | | | | |
|---|---|---|---|---|
| 2,786,500 A * | 3/1957 | Unterfranz | ............... | B25H 1/04 144/285 |
| 3,007,499 A * | 11/1961 | Dobslaw | ................ | B27B 5/201 83/486.1 |
| 4,483,573 A * | 11/1984 | Keller | ................. | B23D 47/025 312/351 |
| 4,587,875 A * | 5/1986 | Deley | ................. | B23D 45/024 83/486.1 |
| 6,151,776 A * | 11/2000 | DiSaverio | ............. | H01R 35/02 29/865 |
| 6,349,712 B1 * | 2/2002 | Halstead | ................ | B28D 1/045 30/379 |
| 8,834,209 B2 * | 9/2014 | Conrad | ............. | H01R 13/6456 439/680 |
| 9,327,355 B2 * | 5/2016 | Struss | ..................... | B27B 5/222 |
| 10,420,287 B2 * | 9/2019 | Chou | ..................... | A01G 3/086 |
| 2008/0210072 A1 * | 9/2008 | Chang | ................... | B23D 47/02 83/471 |
| 2010/0212468 A1 * | 8/2010 | Ouellette | ................ | B27B 5/165 83/477 |
| 2011/0079127 A1 * | 4/2011 | Somogyi | .............. | B23D 47/025 83/471.3 |
| 2012/0279368 A1 * | 11/2012 | Janson | ................... | B27B 5/165 83/13 |
| 2013/0081842 A1 * | 4/2013 | Rozmarynowski | ... | H02J 7/0068 173/217 |
| 2013/0092001 A1 * | 4/2013 | Behr | ..................... | B23D 47/08 83/471.2 |
| 2015/0246399 A1 * | 9/2015 | Knight | ................. | B23D 45/044 83/397 |

* cited by examiner

*Primary Examiner* — Ghassem Alie
(74) *Attorney, Agent, or Firm* — Bold IP PLLC; Christopher Mayle

(57) ABSTRACT

A system and method for a triple saw system that may utilize a removable circular saw in a plurality of different configurations while still allowing the user may use removable circular saw remotely by removing it from the bench whereby the removable circular saw may have a bottom plate for use in connecting to the bench saw or to the miter saw.

1 Claim, 6 Drawing Sheets

TRIPLE SAW

BACKGROUND

The disadvantage of using a regular handheld circular saw is that it needs to drill four holes on the bottom plate to attach to the bench, and need to put grips to keep switches at the 'ON' position, and always keep the power cable connected to the wall outlet. Therefore that is not safe to use and is a safety violation.

SUMMARY

The modified Handheld circular saw is a better design, with a specifically designed power cable.

DETAILED DESCRIPTION

Figure 1:
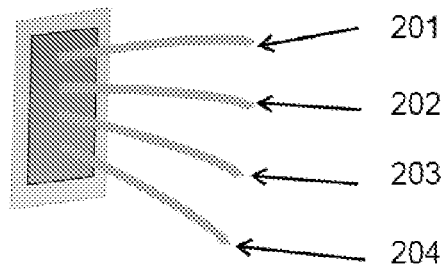
FIG. 1 illustrates the wire connections of the removable circular saw of the TRIPLE SAW system.

The handheld circular saw has a power cable with four wires—live1, live2, neutral, and ground.—FIG. 1

Figure 2:
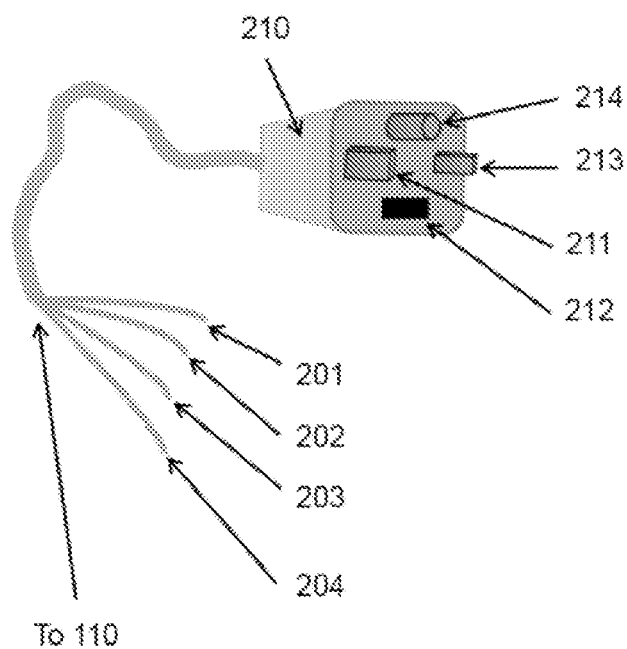
FIG. 2 illustrates the electrical plug of the removable circular saw.

The plug at the other end of the power cable has a ground pin, neutral pin, live1 pin, and a hole for live2.—FIG. 2

In the handheld circular saw, the live1 wire connects to the on/off switches of the handheld saw.

Live2 bypass on/off switches of the handheld circular saw.

The live1 wire on the power cable connects to the wall outlet live wire, and there is no connection to the live2 from the wall outlet. This design is for handheld circular saw operation—FIG. 2

Figure 3:
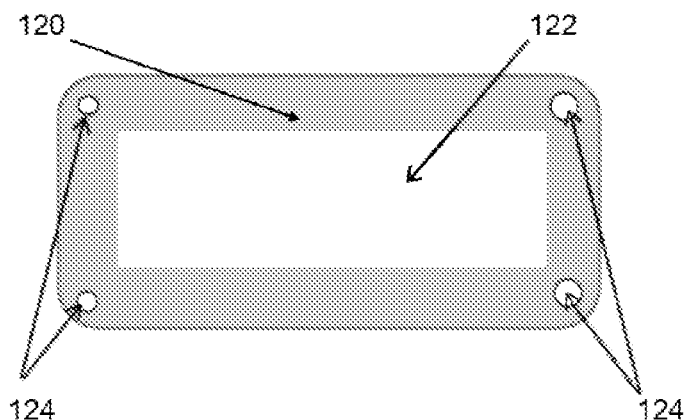
FIG. 3 illustrates the bottom plate of the removable circular saw.

There are four holes on the bottom plate of the handheld circular saw. Front holes are larger than back holes—FIG. 3
Bench Saw Power Connection When using the Bench saw, the Circular saw power cable plug connects to the outlet on the Bench—FIG. 4.

That power outlet has connections of ground, neutral, and live2. No connection to live1—FIG. 4

Figure 4:
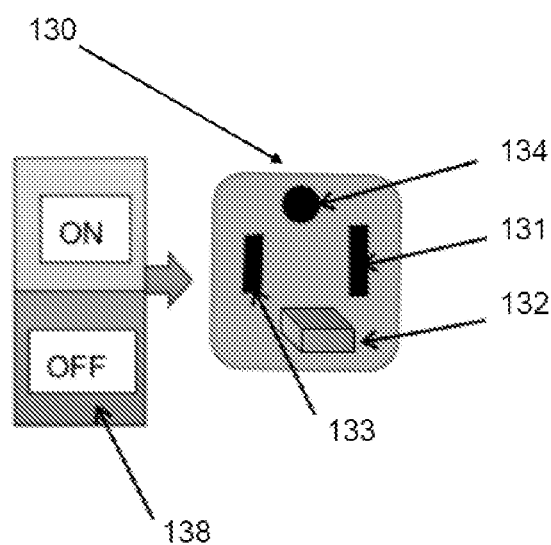
FIG. 4 illustrates the outlet on the bench of the TRIPLE SAW system.

Live2 pin connects to the live2 hole on the plug of the special power cable.—FIG. 4

On/Off switch on the Bench connects to the live2 pin and can power on and off to the live2.—FIG. 4

Figure 6:
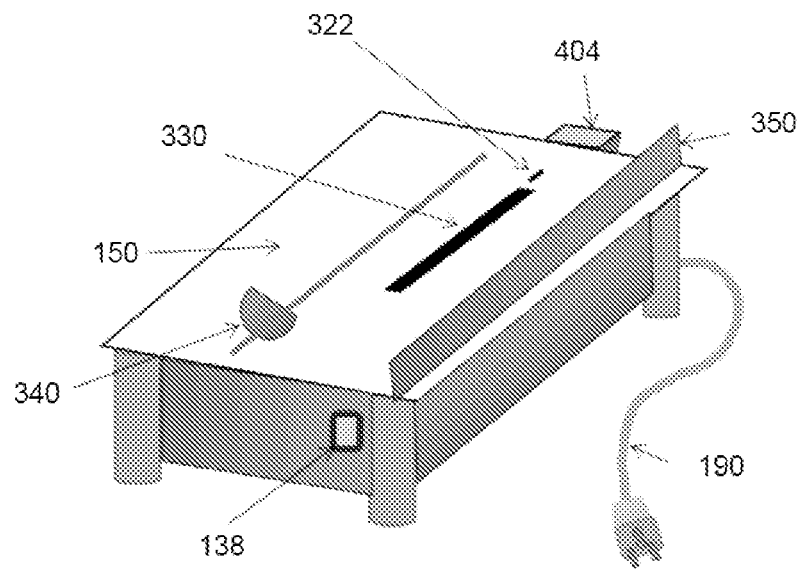
FIG. 6 illustrates another view of the bench saw.

The Bench saw connects to the power from the wall outlet with its cable.—FIG. 6

This power connection design allows for safe operations of the Bench saw

Handheld circular saw attachment to the Bench.

Figure 5:
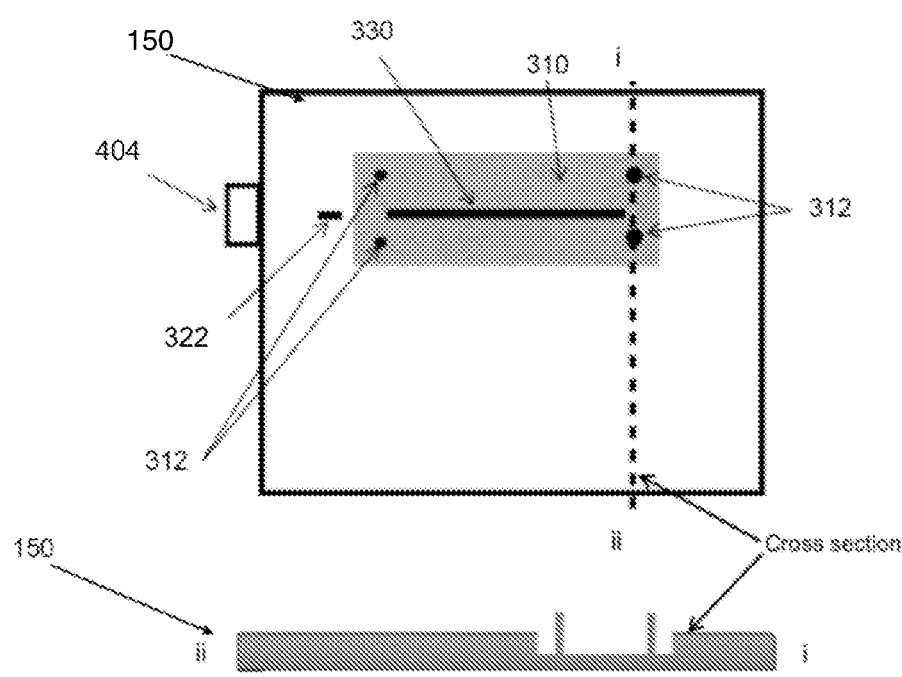
FIG. 5 illustrates the underside of the bench saw.

Inner surface of the top plate of the Bench has a dented area to place the circular saw. Dented area thickness is ⅛ inch to maximize the blade height.—FIG. 5

In the dented area, four bolts hold the circular saw. The diameter of the two front bolts is larger (⅜ inch), and the diameter of the two rear bolts is smaller (¼ inch). Which is to avoid placing the circular saw on the wrong side.—FIG. 5

Bolts come with butterfly nuts or clamps to attach the circular saw without a tool.

Rest of the surface area of the table top can be ¼ inch to ⅝ inch for stability.

The top table plate is removable and attaches the handheld Circular saw underneath it quickly.

The Bench saw consist of the following regular features. Opening for the circular saw blade on the top surface of the bench—FIG. 6

Sliding miter gauge—FIG. 6

Fence—FIG. 6

Electrical cable to the wall outlet—FIG. 6

Figure 7:
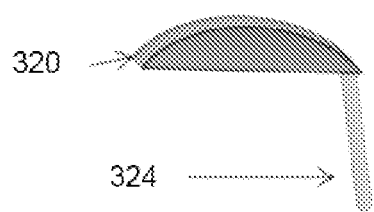
FIG. 7 illustrates the bench saw blade guard

Blade safety guard—FIG. 7

Miter Saw Power Connection

When using the Miter saw, the circular saw power cable plug connects to the outlet on the Bench—FIG. 4

Miter saw arm and Circular saw attachment.

Figure 8:
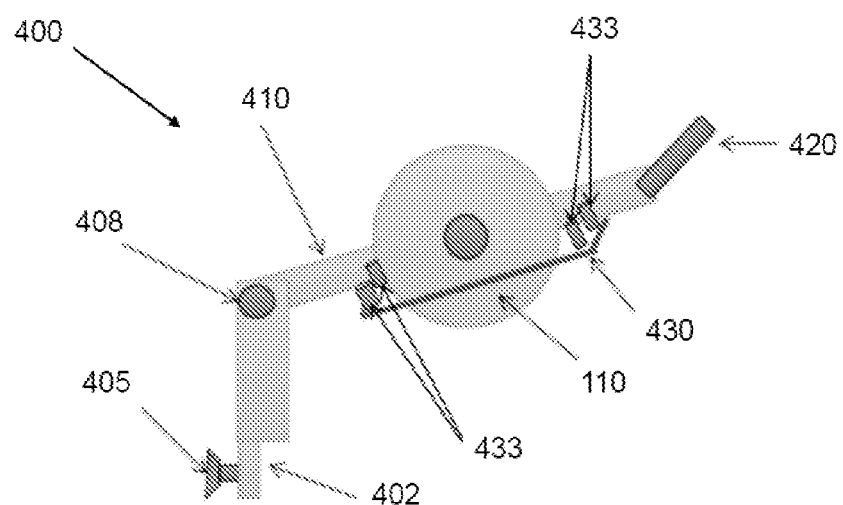
FIG. 8 illustrates the miter saw of the triple saw system.
Figure 9:
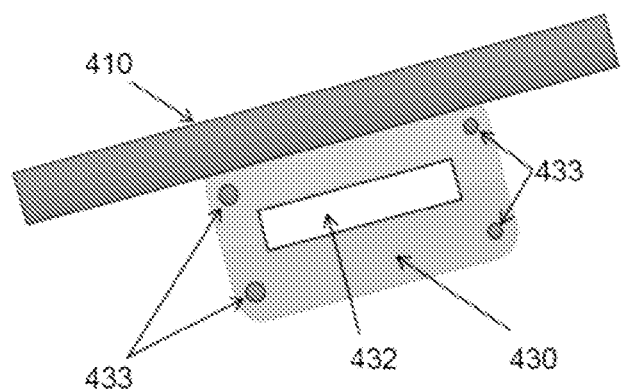
FIG. 9 illustrates the platform attached to the miter saw.

There is an arm with a platform with four bolts to place and secure the Circular saw with the same four holes and butterfly nuts or clamps.—FIG. 8 and FIG. 9

The arm can be attached to the Bench easily and secure with a hand-tighten knob—FIG. 8

The handle, which is at the end of the upper arm to hold and move the arm up and down—FIG. 8

The arm can move up and down. Down to the bench and up with a spring load.—FIG. 8

When the arm is down, it aligns with the opening on the Bench for the blade. And the platform plate seat on top of the bench surface when fully down.

Figure 10:
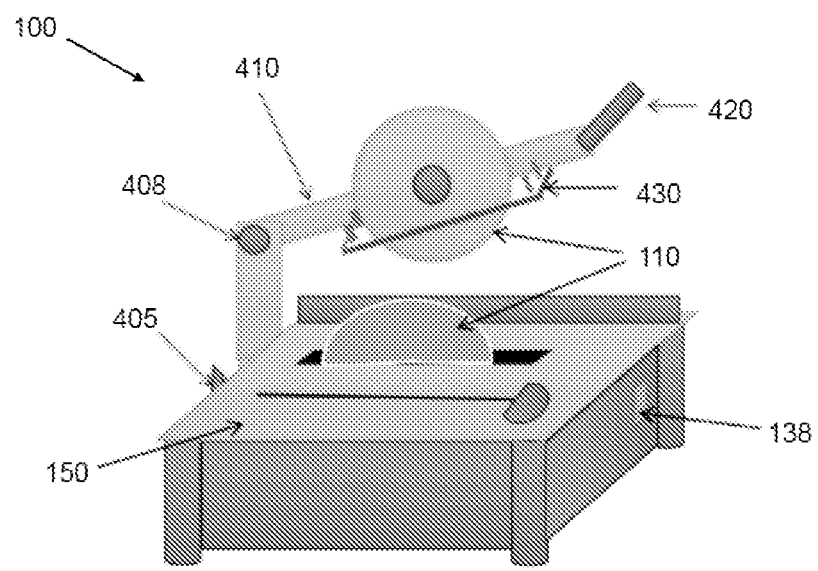
FIG. 10 illustrates the bench saw, miter saw, and the removable circular saw together in the TRIPLE SAW system.

All Together—FIG. 10

It is hard to show all three pieces of equipment together because the same Handheld circular saw uses for all. But this illustrates the basic view of combining of all three pieces equipment.

This Triple Saw use the modified Handheld circular saw for all three pieces of equipment but for three different functions.

For consumers, it is less costly, easy to carry, and requires less maintenance for one machine than three if bought separately Handheld Circular saw, Bench saw and Miter saw.

What is claimed is:

1. A triple saw system, having an arm, a bench, and a removable circular saw, wherein the removable circular saw is standalone in a first configuration, wherein the removable circular saw is connected to the arm becoming a miter saw in a second configuration, wherein the removable circular saw is connected to an underside of the bench becoming a bench saw in a third configuration, wherein the removable circular saw has a power cable that has four wires: a live 1 wire, live 2 wire, a neutral wire, and a ground wire, wherein the removable circular saw has a plug at another end of the power cable that has a ground pin, neutral pin, a live 1 pin, and a hole for a live 2 pin, wherein the live 1 wire connects to an on/off switch of the removable circular saw wherein in the first configuration, the live 1 wire connects to a wall outlet and there is no connection to the live 2 wire from the wall outlet wherein the live 2 wire bypass the on/off switch, wherein in the second configuration and the third configuration, the plug connects to a power outlet on the bench, wherein the power outlet has connections for ground, neutral, and live 2 with no connection to live 1 wherein the live 2 connection of the power outlet connects to the hole on the plug, wherein the bench has a power cord for connecting to the wall outlet.

* * * * *